United States Patent
Hutcheson

(10) Patent No.: US 12,498,921 B2
(45) Date of Patent: Dec. 16, 2025

(54) SERVERLESS METHODOLOGY FOR SYSTEM MANAGEMENT OF HETEROGENEOUS INFRASTRUCTURE

(71) Applicant: Dell Products L.P., Round Rock, TX (US)

(72) Inventor: Jacob R. Hutcheson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 18/162,532

(22) Filed: Jan. 31, 2023

(65) Prior Publication Data

US 2024/0256272 A1    Aug. 1, 2024

(51) Int. Cl.
    *G06F 8/71*    (2018.01)
    *G06F 9/54*    (2006.01)

(52) U.S. Cl.
    CPC . *G06F 8/71* (2013.01); *G06F 9/54* (2013.01)

(58) Field of Classification Search
    CPC ..................................... G06F 8/71; G06F 9/54
    See application file for complete search history.

(56) References Cited

U.S. PATENT DOCUMENTS

| | | | | |
|---|---|---|---|---|
| 11,210,070 | B2 * | 12/2021 | Velammal | G06F 8/36 |
| 2011/0314042 | A1 * | 12/2011 | Nuggehalli | H04N 1/00244 |
| | | | | 715/810 |
| 2018/0159735 | A1 * | 6/2018 | Beyh | H04L 41/0823 |
| 2021/0073059 | A1 * | 3/2021 | Swildens | G06Q 10/107 |
| 2021/0109785 | A1 * | 4/2021 | Prabhakaran | G06F 9/4887 |
| 2021/0144517 | A1 * | 5/2021 | Guim Bernat | H04L 9/3247 |
| 2021/0160202 | A1 * | 5/2021 | Swildens | H04L 67/02 |
| 2021/0263779 | A1 * | 8/2021 | Haghighat | G06F 9/5061 |

FOREIGN PATENT DOCUMENTS

| | | | | |
|---|---|---|---|---|
| DE | 112019005604 | T5 * | 9/2021 | G06F 11/301 |
| WO | WO-2020037162 | A1 * | 2/2020 | G06F 9/5027 |

* cited by examiner

*Primary Examiner* — Phillip H Nguyen
(74) *Attorney, Agent, or Firm* — Jackson Walker L.L.P.

(57) ABSTRACT

Disclosed methods and systems for implementing serverless management of platform resources maintain a function-as-a-service (FaaS) mapping database associating a resource and management function combination with a locator identifying a container image for implementing management interactions required to perform the management function. When a FaaS request indicating a function-resource combination is detected, the applicable locator is retrieved from the mapping database and the corresponding container image is deployed. Each resource may correspond to a specific version of a specific make or model, e.g., a server model and a firmware version. API, protocol, and messaging specifics for performing the function on the resource are embedded in each container image. Thus, the container image for an inventory operation on a server with a first version of firmware may execute SOAP-based messaging while the image for the same operation on the same server model provisioned with a second firmware version may invoke a RESTful API.

14 Claims, 3 Drawing Sheets

SERVERLESS METHODOLOGY FOR SYSTEM MANAGEMENT OF HETEROGENEOUS INFRASTRUCTURE

TECHNICAL FIELD

The present disclosure pertains to information handling systems and, more specifically, management of information handling system infrastructure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When developing a system management software platform, much depends on the software's ability to understand the APIs and data model of the target device (s). Generally, standardized protocols evolve over time to define consistent API surfaces and payloads for managing infrastructure. As technology trends change, new standards arise to reflect the changes. Additionally, infrastructure management is not a static feature set. As new concepts and features are implemented, system management protocols must adapt to provide appropriate management support.

The ability to support API standards that change over time is one challenging aspect of implementing a system management platform. Until fairly recently, many widely implemented management platforms complied with WS-Management (MS-Man), a Distributed Management Task Force (DMTF) open standard defining a Simple Object Access Protocol/Extensible Markup Language (SOAP/XML) based messaging protocol for managing servers and other devices, applications, and various Web services. More recently, the Redfish standard, which implements a representational state transfer (REST)-compliant or RESTful interface for managing servers, storage, networking and converged infrastructure, has emerged as the prevailing standard for system management platforms. In addition, older protocols, including Simple Network Management Protocol (SNMP) and Intelligent Platform Management Interface (IPMI)-over-LAN are still in use. System management is still further complicated because different generations of hardware/firmware may implement different API standards. Even within a specific API or Data Model, there can be implementation differences from one hardware/firmware release to the next.

The issues noted above have resulted in platform implementations restrict the list of supported devices to those that implement specific system management protocols or originate from certain vendors and/or absorb the complexity of recognized device-protocol-function permutations within application code. Still further complicating the platform management landscape, new system management protocols may be implemented alongside previous protocols and may not reach parity for multiple releases. This has led to a large amount of complexity when attempting to support many generations of hardware from multiple vendors

SUMMARY

System management challenges discussed above are addressed by disclosed systems and methods implementing a serverless system management solution suitable for one or more generations of heterogeneous platform infrastructure encompassing a plurality of system management protocols and version-specific implementation details. In at least one embodiment, a group of container images is defined, each of which implements the specific exchanges required to accomplish a given management operation for one or more supported resources. Container images may be specific to specific combinations of device and firmware version and the protocols and messaging details embedded in each container are independent of one another. The correct container image to use to accomplish a given operation is determined by mapping attributes of a managed device to specific container image coordinates. These mappings are published as part of a FaaS catalog, which can be amended or updated over time.

In at least one embodiment, system management methods disclosed herein maintain a function as a service (FaaS) mapping database comprising a plurality of entries, wherein each entry associates an infrastructure resource and a management function with a locator identifying a container image configured to implement management exchanges required to perform the applicable management function on the appropriate resource. Responsive to detecting a FaaS request indicating a management function and a resource, a system management FaaS controller may retrieve the locator for the entry from the mapping database and provide the locator to container infrastructure to deploy the container image to the resource. The container image includes executable code to perform management exchanges in compliance with any one or more suitable system management APIs and standards including, without limitation, representational transfer state (REST) APIs, simple object access protocol (SOAP) APIs, and the like.

Each container image may be associated with a particular combination of a device model and a version such as a particular firmware version of a particular server model. The FaaS mapping database may include multiple entries for a particular device model wherein each entry corresponds to a particular firmware version, thereby enabling and supporting independent and distinct containers for each firmware version. Similarly, different versions of a model may utilize the same protocols, but different exchanges, to perform the same function.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
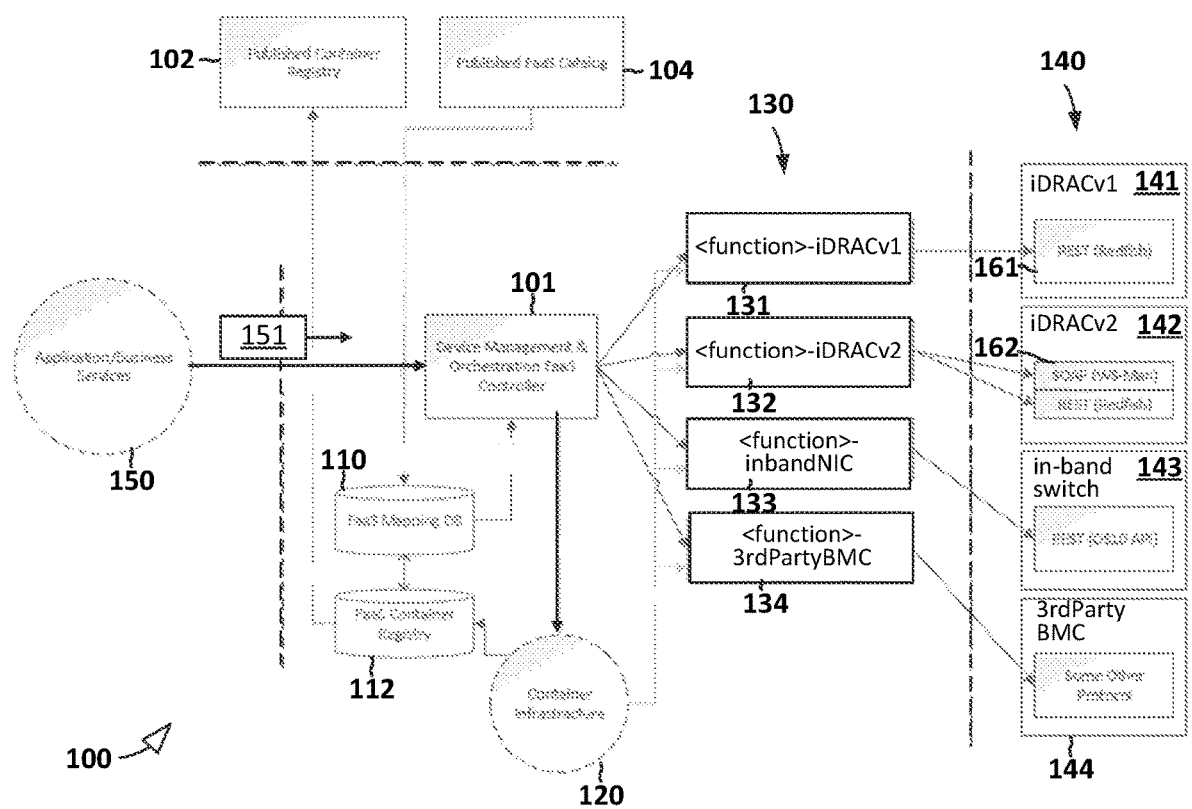
FIG. 1 illustrates an exemplary FaaS-based system management platform in accordance.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 depicts an exemplary system management platform 100 in accordance with disclosed subject matter for a container-based system management solution in which protocol, messaging, and other implementation details of management interactions for performing a given management operation on a specific version of a particular device are incorporated into a container image. Container images for supported combinations of management functions and platform resources may be maintained in a published container registry and may include a container image corresponding to each supported combination of management function and infrastructure resource. Resources may be defined in accordance with one or more characteristics or parameters of the resource. As an illustrative example, a first resource may correspond to a specific make and/or model of a server provisioned with a first version of system firmware while a second resource may correspond to the given make and/or model of the server provisioned with a second version of system firmware. In this example, the container registry may include two independent and distinct container images for performing a given management operation on the server model, with a first container image corresponding to instances of the server model provisioned with the first version of system firmware and a second container image corresponding to the instances of the server model provisioned with the second version of system firmware. The two containers may include or employ different API protocols, e.g., REST/JSON, SOAP/XML, etc., and/or different management interactions to perform the management operation and all protocol-specific and command-specific details are encapsulated in the applicable container image.

The platform 100 illustrated in FIG. 1 includes a FaaS-based system management controller (FSMC) 101 communicatively coupled to a FaaS mapping database 110, a FaaS container registry 112, and container infrastructure resources 120. In at least some embodiments, FSMC 101 monitors and processes system management requests 151 received from external applications/business services 150. A system management request 151 may indicate a system management operation to be performed on a specified resource or device. FSMC 101 may access FaaS mapping database 110 to retrieve a locator for a container image 130 corresponding to the management operation and infrastructure resource indicated in the request. FSMC 101 may forward the locator information for the appropriate container image to container infrastructure 120, which may then retrieve the container image from FaaS container registry 112 and deploy the retrieved container image 130 to the appropriate infrastructure resource 140 for execution. As depicted in FIG. 1, a published container registry 102 may be maintained, for example, on a Web portal that may be periodically consumed by platform 100. Likewise, platform 100 may have access to a published catalog 104 of FaaS locators and, in such embodiments, platform may periodically synchronize FaaS mapping database 110 to reflect the locators included in the public catalog 104.

In at least one embodiment, infrastructure resources 140, including but not limited to servers and other hardware devices, may be specified by two or more parameters. As a non-limiting example, a server-type resource may be specified by a combination of a model identifier and a version identifier wherein the version identifier indicates a version of system firmware code provisioned on the applicable resource.

As depicted in FIG. 1, container images 130 include a first container image 131 for performing a particular function on an infrastructure resource identified as iDRACv1 141, wherein iDRAC refers to a baseboard management controller resource, illustrated in and described with reference to FIG. 4 below, from Dell Technologies. The container images 130 depicted in FIG. 1 further include a second container image 132 corresponding to the same management function as first container image 132, but configured for use in conjunction with an infrastructure resource identified as iDRACv2. In this example, iDRACv1 141 and iDRACv2 142 may refer to identical or similar iDRAC hardware resources configured with two different firmware versions. The illustrated container images 130 further include a container image 133 for performing the management function on an in-band network switch 143 and a container image 134 for performing the management function on a $3^{rd}$ party BMC 144.

It should be noted that, although first firmware version 131 and second firmware version 132 are designed for the same management function and are executed on substantially similar or identical hardware, the two container images employ a different combination of management APIs. Specifically, whereas the first container image 131 uses a Redfish (RESTful) API 161 second container image 132 is based on multiple APIs including a WS-man (SOAP based) API 162. Thus, platform 100 does not impose hardware-based or function-based API constraints on the container images across different firmware versions.

For the sake of clarity and brevity, FIG. 1 illustrates container images for a single system management function, e.g., an inventory function, and a small number of infrastructure resources. It will be appreciated by those of ordinary skill, however, that other implementations may include substantially more resources and may support container images for more system management operations.

Figure 2:
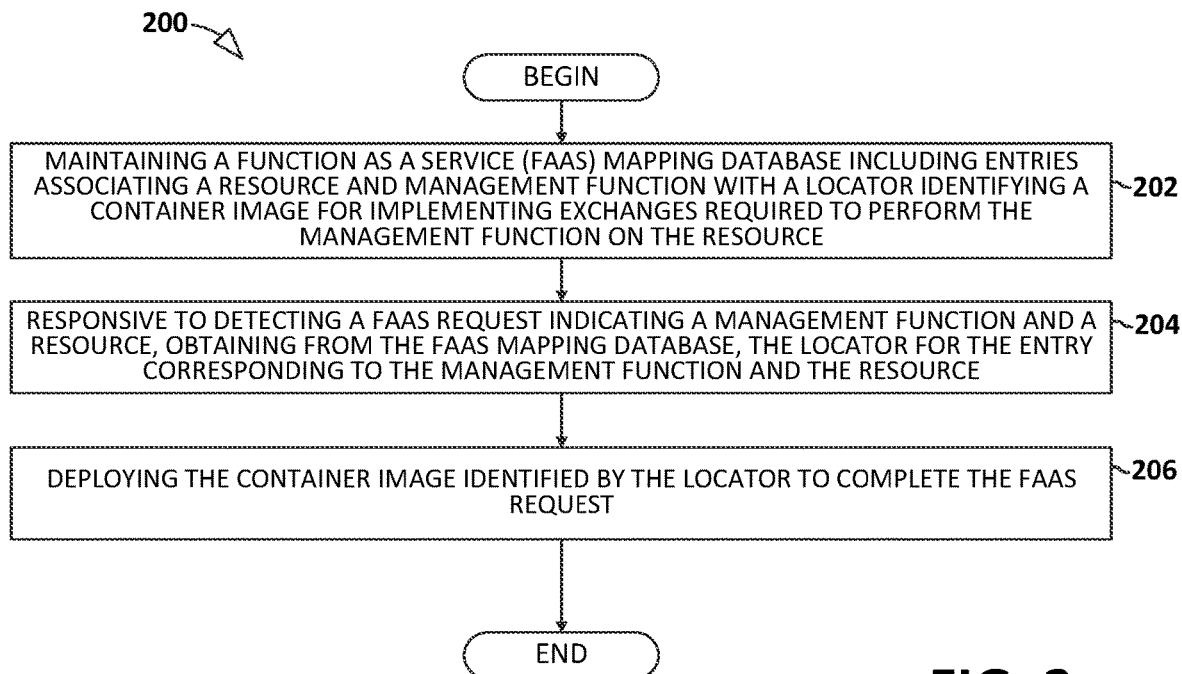
FIG. 2 illustrates a flow diagram for a system management method employing container images to implement management functions for managed resources.

Referring now to FIG. 2, a flow diagram illustration of a container-based method 200 for implementing a serverless, system management platform for managing heterogeneous infrastructure is presented. In some embodiments, one or more of the operations illustrated in FIG. 2 may be performed by the FSMC 101 of FIG. 1. The illustrated method 200 may, in at least some embodiments, includes maintaining (operation 202) a FaaS mapping database including a plurality of entries. Each entry in the mapping database may associate a resource and a corresponding management function with a locator identifying a container image configured to implement management exchanges required to perform the management function on the resource. The method 200 illustrated in FIG. 2 further includes responding to detecting a FaaS request indicating a management function and a resource by obtaining (operation 204) from the FaaS mapping database, the locator for the entry associated with the indicated management function and the resource. The method 200 depicted in FIG. 2 further includes invoking the platform's container infrastructure to deploy (operation 206) the container image identified by the locator to the appropriate infrastructure resource and executed the request management function.

Figure 3:
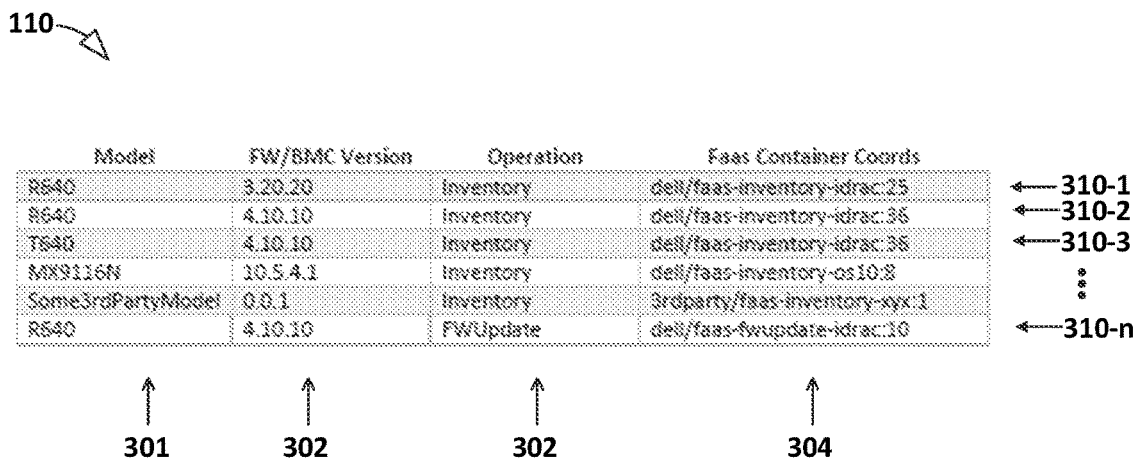
FIG. 3 illustrates an exemplary data structure including mapping information associating container images for performing a given management operation on a specified infrastructure resource.

Referring now to FIG. 3, an exemplary FaaS mapping database 110 is depicted. The depicted mapping database includes multiple entries 310-1 through 310-n wherein each entry 310 includes a set of fields 301 through 304, each corresponding to a parameter, feature, or other characteristic of a supported infrastructure resource. The specific fields 301 through 304 illustrated in FIG. 3 are illustrative rather than limiting and other implementations may include more, fewer, and/or different fields. The FaaS mapping database 110 depicted in FIG. 3 includes a model identifier field 301, a BMC/firmware version field 302, a management operation field 303, and a locator field 304 including locator coordinates for retrieving the applicable container image from FaaS container registry 112. It should be noted that, as depicted in FIG. 3, two or more resources may refer to the same container image, where entry 310-2, corresponding to server model R640, and entry 310-3, corresponding to server model T640, both identify the same container image in field 304.

Figure 4:
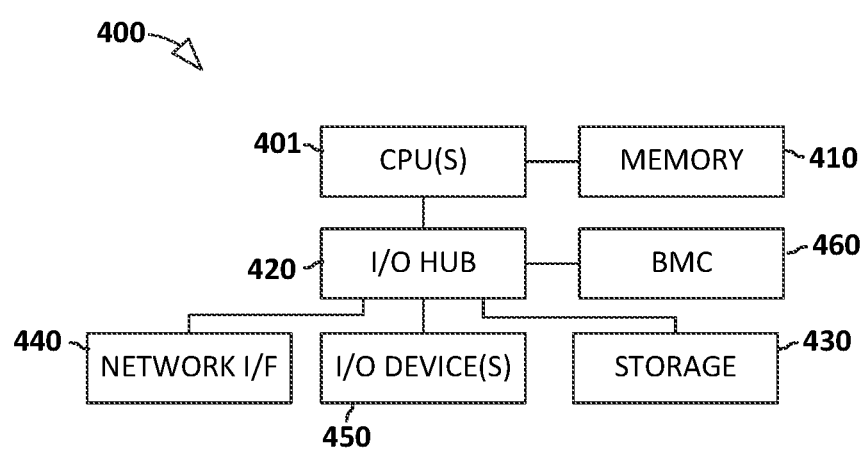
FIG. 4 illustrates an exemplary information handling system suitable for use in conjunction with the features illustrated in FIGS. 1-3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
    maintaining a function as a service (FaaS) mapping database comprising a plurality of entries, wherein each entry associates a resource and a management function with a locator identifying a container image configured to implement management exchanges required to perform the management function on the resource;
    responsive to detecting a FaaS request indicating a management function and a resource, obtaining from the FaaS mapping database, the locator for the entry corresponding to the management function and the resource; and
    deploying the container image identified by the locator to complete the FaaS request
    wherein each resource is associated with a model and a version and wherein each entry in the FaaS mapping database corresponds to a particular model and version, and further wherein the model is provisioned with firmware and wherein the version indicates a version of the firmware, and further wherein the FaaS mapping database includes:
        a first entry corresponding to a management function for the model provisioned with a first version of the firmware; and
        a second entry corresponding to the management function for the model provisioned with a second version of the firmware.

2. The method of claim 1, the management exchanges include management exchanges in compliance with at least one management API selected from:
    a representational transfer state (REST) API; and
    a simple object access protocol (SOAP) API.

3. The method of claim 1, wherein the FaaS mapping database includes:
    a first entry corresponding to a management function for a first model provisioned with a first version of the firmware; and
    a second entry corresponding to the management function for a second model provisioned with the first version of the firmware;
    wherein the locators associated with the first and second entries identify the same container image.

4. The method of claim 1, wherein the FaaS mapping database includes:
    a first entry corresponding to a management function for a first version of a particular model; and
    a second entry corresponding to the management function for a second version of the particular model.

5. The method of claim 4, wherein the container image corresponding to the first entry is configured to implement different management exchanges than the container image corresponding to the second entry.

6. The method of claim 4, wherein the container image corresponding to the first entry is configured to implement management exchanges in accordance with a first management API and the container image for the second entry is configured to implement management exchanges in accordance with a second management API.

7. The method of claim 1, wherein deploying the container image includes provisioning a management component of the resource with the container image, wherein the management component is selected from:
    an original equipment manufacturer management controller;
    an in-band network switch; and
    a third party management controller.

8. An information handling system, comprising:
    a central processing unit (CPU); and
    a computer readable memory, accessible to the CPU, including processor executable instructions that, when executed by the CPU, cause the system to perform operations including:
        maintaining a function as a service (FaaS) mapping database comprising a plurality of entries, wherein each entry associates a resource and a management function with a locator identifying a container image configured to implement management exchanges required to perform the management function on the resource;
        responsive to detecting a FaaS request indicating a management function and a resource, obtaining from the FaaS mapping database, the locator for the entry corresponding to the management function and the resource; and
        deploying the container image identified by the locator to complete the FaaS request;
        wherein each resource is associated with a model and a version and wherein each entry in the FaaS mapping database corresponds to a particular model and version, and further wherein the model is provisioned with firmware and wherein the version indicates a version of the firmware, and further wherein the FaaS mapping database includes:
- a first entry corresponding to a management function for a first model provisioned with a first version of the firmware; and
- a second entry corresponding to the management function for a second model provisioned with the first version of the firmware;
- wherein the locators associated with the first and second entries identify the same container image.

9. The information handling system of claim 8, the management exchanges include management exchanges in compliance with at least one management API selected from:
- a representational transfer state (REST) API; and
- a simple object access protocol (SOAP) API.

10. The information handling system of claim 8, wherein the FaaS mapping database includes:
- a first entry corresponding to a management function for the model provisioned with a first version of the firmware; and
- a second entry corresponding to the management function for the model provisioned with a second version of the firmware.

11. The information handling system of claim 8, wherein the FaaS mapping database includes:
- a first entry corresponding to a management function for a first version of a particular model; and
- a second entry corresponding to the management function for a second version of the particular model.

12. The information handling system of claim 11, wherein the container image corresponding to the first entry is configured to implement different management exchanges than the container image corresponding to the second entry.

13. The information handling system of claim 11, wherein the container image corresponding to the first entry is configured to implement management exchanges in accordance with a first management API and the container image for the second entry is configured to implement management exchanges in accordance with a second management API.

14. The information handling system of claim 8, wherein deploying the container image includes provisioning a management component of the resource with the container image, wherein the management component is selected from:
- an original equipment manufacturer management controller;
- an in-band network switch; and
- a third party management controller.

* * * * *